United States Patent [19]

Usui et al.

[11] Patent Number: 5,104,627

[45] Date of Patent: Apr. 14, 1992

[54] EXHAUST GAS CLEANING APPARATUS

[75] Inventors: Masayoshi Usui, Numazu; Haruo Serizawa, Shizuoka, both of Japan

[73] Assignee: Usui Kokusai Sangyo Kabushiki Kaisha, Japan

[21] Appl. No.: 450,113

[22] Filed: Dec. 13, 1989

[30] Foreign Application Priority Data

Dec. 19, 1988 [JP] Japan ............. 63-163556[U]
Dec. 19, 1988 [JP] Japan ............. 63-163557[U]

[51] Int. Cl.⁵ ............................................ F01N 3/28
[52] U.S. Cl. ................................... 422/171; 422/179; 422/180; 422/190; 422/193; 422/211; 422/221; 422/222; 55/DIG. 30; 60/299; 60/301; 29/890; 29/890.08
[58] Field of Search ............... 422/171, 172, 176, 177, 422/179, 180, 190, 193, 194, 211, 221, 222; 55/DIG. 30; 502/527; 29/890, 890.08; 60/299, 301

[56] References Cited

U.S. PATENT DOCUMENTS

| 4,282,186 | 8/1981 | Nonnenmann et al. | 422/180 |
| 4,536,371 | 8/1985 | Thayer et al. | 422/180 X |
| 4,795,615 | 3/1989 | Cyron et al. | 422/179 |
| 4,818,746 | 4/1989 | Cyron | 502/527 |

*Primary Examiner*—Lynn Kummert
*Attorney, Agent, or Firm*—Lowe, Price, LeBlanc & Becker

[57] ABSTRACT

In an exhaust gas cleaning apparatus, at least two honeycomb core bodies each carrying a cleaning catalyst are arranged, with at least one axial space therebetween, in a metal casing having an enlarged-diameter portion. The outer peripheral surfaces of the core bodies are fixed to the inner surface of the casing so that each core body is expandable and contractible axially. The result is that separation between each core body and the casing can be prevented, thus improving the durability. Further, an excellent cleaning performance can be achieved not only due to the heat insulating effect as well as the gas stirring effect by the enlarged-diameter casing portion, but also due to the gas turbulent effect by the inter-body space.

13 Claims, 4 Drawing Sheets

EXHAUST GAS CLEANING APPARATUS

BACKGROUND OF THE INVENTION

1. Field of the Invention

This invention relates to an exhaust gas cleaning apparatus which is generally provided at a midpoint of an exhaust system of an automobile and which is composed of a metal-made honeycomb core body adapted for carrying thereon an exhaust gas cleaning catalyst and fitted in a tubular metal casing. More particularly, the invention relates to an exhaust gas cleaning apparatus in which the constituent members of the apparatus are joined with adequate strength so as to resist against separation, cracking and other breakage due to thermal strains.

2. Description of the Related Art

In conventional exhaust gas cleaning apparatuses of the mentioned type, a sheet-like band made of a heat-resistant thin metal sheet and a corrugated band made from another thin metal sheet of the same kind are superposed one over the other to have areas of contact therebetween. They are then rolled together spirally into a honeycomb form (hereinafter called "honeycomb core body") defining many network-patterned gas flow passages along the central axis thereof for allowing exhaust gas to pass therethrough. The honeycomb core body is enclosed by a tubular metal casing which has a single-layer body and opens at opposite ends thereof. The honeycomb core body and the tubular metal casing are firmly joined by brazing, for example, so as to resist against the stress due to thermal strains resulting from the high temperature of exhaust gas as well as the exothermic reaction between exhaust gas and the exhaust gas cleaning catalyst, and also so as to resist against the severe vibrations while the automobile is running. The members of the honeycomb core body, i.e., the sheet-like band and the corrugated band are joined together at the areas of contact therebetween by one of various known manners.

However, this conventional arrangement cannot remain useful for a long period of time. For example, large separation between the outermost peripheral surface of the honeycomb core body and the inner surface of the metal casing tend to occur, in the direction of the axis of the honeycomb core body (i.e., in the exhaust gas flowing direction), due to the stress resulting from thermal strains under the above-mentioned severe thermal environments. Further, about the peripheral part (the outer peripheral surface and the portion immediately thereinside) of the honeycomb core body, the members (a sheet-like band and a corrugated band) of the honeycomb core body tend to be separated, cracked or otherwise broken to a large extent.

Attempts have been made to solve the foregoing problem, and it has turned out that to merely join the honeycomb core body and the metal casing together firmly is not successful.

SUMMARY OF THE INVENTION

It is therefore an object of this invention to provide an exhaust gas cleaning apparatus in which separation between the outermost peripheral surface of at least one honeycomb core body and the inner surface of a tubular metal casing as well as cracking or other breakage can be prevented for a long period of time without completely fixing the outer peripheral surface of the honeycomb core body to the inner surface of the metal casing.

According to a first aspect of this invention, there is provided an exhaust gas cleaning apparatus comprising: two honeycomb core bodies each adapted for carrying thereon an exhaust gas cleaning catalyst and composed of a sheet-like band made of a thin metal sheet and a corrugated band made from another thin metal sheet, the sheet-like band and the corrugated band being superposed one over the other so as to have areas of contact therebetween and so as to define many network-patterned gas flow passages along the central axis thereof; and a tubular metal casing opening at opposite ends and having an enlarged-diameter portion, the two honeycomb core bodies being arranged, with an axial space therebetween, in and fixed to the metal casing, an outer peripheral surface of each of the two honeycomb core bodies being fixed to an inner surface of the metal casing near a respective one of the opposite open ends thereof, the outer peripheral surface of each honeycomb core body being kept out of contact with the inner surface of the metal casing near the axial space.

According to a second aspect of this invention, there is provided an exhaust gas cleaning apparatus comprising: at least two honeycomb core bodies each adapted for carrying thereon an exhaust gas cleaning catalyst and composed of a sheet-like band made of a thin metal sheet and a corrugated band made from another thin metal sheet, the sheet-like band and the corrugated band being superposed one over the other so as to have areas of contact therebetween and so as to define many network-patterned gas flow passages along the central axis thereof; and a tubular metal casing opening at opposite ends and including at least two small-diameter portions contacting the outer peripheral surface of each honeycomb core body near opposite ends thereof, and at least one large-diameter portion extending between the small-diameter portions, one of the first portion of the metal casing being fixed to the outer peripheral surface of each honeycomb core body, the other first portion of the metal casing being disposed against the outer peripheral surface of each honeycomb core body in a non-fixed fashion.

With this arrangement, partly since at least two honeycomb core bodies are arranged, with an axial space of a desired wide, in the metal casing, and partly since part of the outer peripheral surface of each honeycomb core body is left non-fixed to the inner surface of the metal casing so as to be expandable and contractible axially, it is possible to effectively absorb and relax the stress due to thermal strains. Further, since the space between the honeycomb core bodies creates a turbulent flow of exhaust gas, it is possible to clean exhaust gas with improved efficiency. Furthermore, since the enlarged-diameter portion of the metal casing defines jointly with the outer peripheral surface of the honeycomb core bodies a heat insulating hollow, a uniform distribution of temperature in the apparatus can be achieved, thus preventing the one-sided stress due to thermal strains.

The above and other objects, features and additional advantages of this invention will become manifest to those versed in the art upon making reference to the detailed description and the accompanying drawings in which a variety of preferred structural embodiments incorporating the principle of this invention are shown by way of illustrative example.

DETAILED DESCRIPTION

Figure 1:
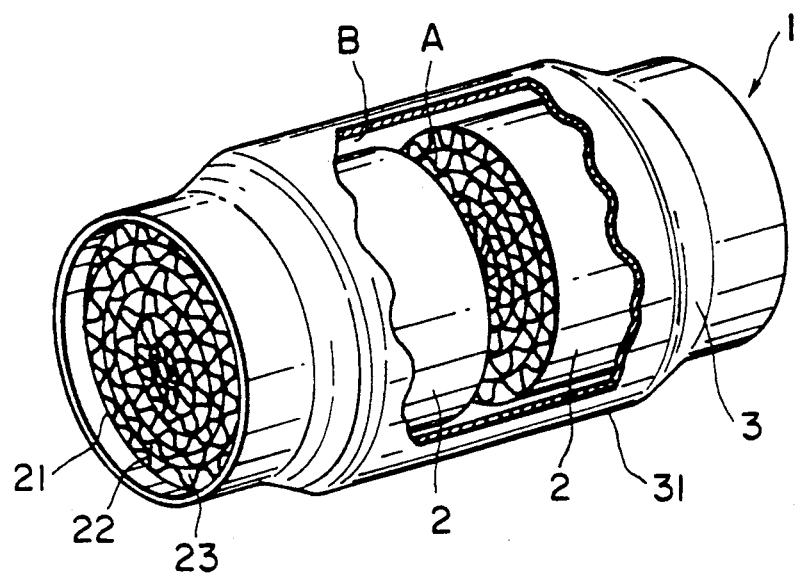
FIG. 1 is a perspective view, partially broken away, of an exhaust gas cleaning apparatus according to a first embodiment of this invention.

As discussed above, generally, in the manufacture of the conventional exhaust gas cleaning apparatus, a single honeycomb core body is inserted in a tubular metal casing opening at opposite ends, and then the outer peripheral surface of the honeycomb core body and the inner surface of the metal casing are fixed together firmly. However, such conventional cleaning apparatus could not be durable for long service.

Since exhaust gas cleaning apparatuses are to be used under severe thermal environments, the constituent members of the apparatus would be subjected to the large stress due to thermal strains, which is a primary cause to impair the durability.

Specifically, the constituent members of an exhaust gas cleaning apparatus are subjected to a large stress due to thermal strains resulting from the heat alternating load, i.e., the heating and cooling cycle (the cycle within the temperature range of from $-20°$ to $900°$ C. at an exhaust system) depending upon whether the engine of an automobile is in operation or is stopped, whether the load is large or small, and so forth.

Also during the automobile is running, an exhaust gas cleaning apparatus is subjected to a large stress due to thermal strains. Partly due to the difference in distribution of exhaust gas flow (more flow at the central part than at the peripheral part), and partly due to the contact reaction (exothermic reaction) between exhaust gas and an exhaust gas cleaning catalyst (e.g., platinum, palladium, rhodium) carried on the surfaces of the honeycomb core body, the central part of the honeycomb core body is subjected to higher temperature than the peripheral part, which would be a cause for the thermal strains.

Further, the temperature gradient between the outermost peripheral surface of the honeycomb core body and the next outer portion inwardly contiguous thereto is remarkably large, compared to the temperature gradient around the central part. This tendency to separate is accelerated more and more as the honeycomb core body is fixed in the metal casing exposed to the outside air.

Resulting from this, the honeycomb core body and the metal casing tend to be separated along with time lapsing, even though the outermost peripheral surface of the honeycomb core body is fixed to the inner surface of the metal casing by brazing.

Likewise, by the stress due to the thermal strains, separation at the areas of contact between the sheet-like and corrugated bands making up the honeycomb core body tends to occur at the peripheral part between the outermost peripheral surface (of the honeycomb core body) brazed to the inner surface of the metal casing and the next outer portion contiguous thereto. When this separation begins, the members of the honeycomb core body, i.e., the sheet-like and corrugated bands would be cracked or otherwise broken as vibrations from the internal engine or the automobile body are added.

In order to retard or prevent this separation phenomenon, it is necessary to adopt some measure to relax the stress due to thermal strains at the outer peripheral part of the honeycomb core body.

For this purpose, this invention adopts the concept of using a tubular metal casing which has at least enlarged-diameter portions and also using two or more honeycomb core bodies. The fixing manners of the honeycomb core bodies and the metal casing as well as the advantageous features and results of the exhaust gas cleaning apparatus will now be described in greater in detail.

(i) Two honeycomb core bodies are fixed to a tubular metal casing opening at opposite ends and having an enlarged-diameter portion extending along the entire length of metal casing except a pair of marginal portions near the opposite open ends.

The outer peripheral surface of each honeycomb core body is fixed to the inner surface of the metal casing at portions near a respective one of the opposite open ends. The outer peripheral surface of each honeycomb core body, except the marginal portion near the corresponding open end of the metal casing, defines with the inner surface of the enlarged-diameter portion of the metal casing a hollow which offers the heat insulating effect. This hollow allows the individual honeycomb core bodies to expand and contract axially. With the hollow offering the heat insulating effect, the honeycomb core body at its part not fixed to the inner surface of the metal casing could resonate due to the vibrations from the internal engine or the body of an automobile while the automobile is running. In order to make the apparatus proof against vibration, a spacer may be placed in the hollow.

According to the exhaust gas cleaning apparatus thus constructed, partly because the individual honeycomb core bodies are arranged, with an axial space of a predetermined width between the adjacent core bodies, in the metal casing having an enlarged-diameter portion which offers the heat insulating effect, and partly because each honeycomb core body is fixed to the metal casing only at the marginal portion near one of the opposite open ends so that the honeycomb core body at the part near the axial space can expand and contract axially, it is possible to effectively absorb the large axial stress due to thermal strains especially about the outer peripheral surface of the honeycomb core body.

Further, since the axial space creates a turbulent flow of exhaust gas, a uniform cleaning performance can be achieved.

Also, since the hollow defined between the outer peripheral surface of the honeycomb core bodies and the metal casing serves to assist in insulating heat and stirring exhaust gas (as high-temperature gas at the central part flows into the hollow therearound where the temperature of exhaust gas is low), it is possible to achieve a uniform distribution of temperature in the metal casing so that the thermal strains or thermal stress can be prevented from being locally concentrated or one-sided. Thus the cleaning apparatus has an improved durability.

(ii) Two or more honeycomb core bodies are fixed to the metal casing opening at opposite open ends and having at least two enlarged-diameter portions except at portions near the open ends.

The metal casing has at least two enlarged-diameter portions extending along the entire part except near the opposite ends of the individual honeycomb core body.

The outer peripheral surface of one end portion of each honeycomb core body is fixed to the inner surface of the non-enlarged portion of the metal casing. The remaining outer peripheral surface of the honeycomb core body is only disposed against the inner surface of the non-enlarged portion of the metal casing (in a non-fixed fashion, i.e., without fixing by brazing, or the like) so that the non-fixed part of the honeycomb core body can expand and contract axially.

However, the metal casing of this invention should by no means be limited to this specific form; for example, some of the enlarged-diameter portions stride over the central part of the metal casing.

According to the exhaust gas cleaning apparatus thus constructed, partly since the individual honeycomb core bodies are arranged, with an axial space of a predetermined width between the adjacent core bodies, in the metal casing having at least two enlarged-diameter portions, and partly since the outer peripheral surface of each honeycomb core body is fixed to the inner surface of the metal casing, with the outer peripheral surface of the other end of the same honeycomb core body being only disposed against the inner surface of the metal casing, it is possible to effectively absorb the axial stress due to large thermal strains acting especially near the outer peripheral surface of the individual honeycomb core bodies. Further, the outer peripheral surface of each honeycomb core body near the axial space is fixed to or disposed against the inner surface of the metal casing, this apparatus is more durable, compared with the apparatus of (i) above, against the vibrations from the internal engine and the body of an automobile while the automobile is running.

Further, since the axial space between adjacent honeycomb core bodies creates a turbulent flow of exhaust gas, it is possible achieve a uniform cleaning performance throughout the individual honeycomb core bodies.

Still further, since the hollow, defined between the outer peripheral surfaces of the honeycomb core bodies and the inner surface of the enlarged-diameter portion of the metal casing, serves to assist in insulating heat and uniformalizing the distribution of temperature inside the metal casing, it is possible to retard the stress due to thermal strains from being locally concentrated or one-sided, thus causing an improved durability.

With the arrangement in which the metal casing is in contact with the outer peripheral surface of the opposite end portions of each honeycomb core body and has at least one enlarged-diameter portion at the non-contact part, or in which the enlarged portion strides over the central part of the metal casing except the marginal part near the opposite ends of the casing, since high-temperature exhaust gas in the axial space can be drawn to the hollow around the honeycomb core bodies, it is possible to uniformalize the distribution of temperature throughout the individual honeycomb core body.

This invention will now be described in greater detail by the following embodiments with reference to the accompanying drawings; however, this invention should by no means be limited to these specific forms.

Figure 2:
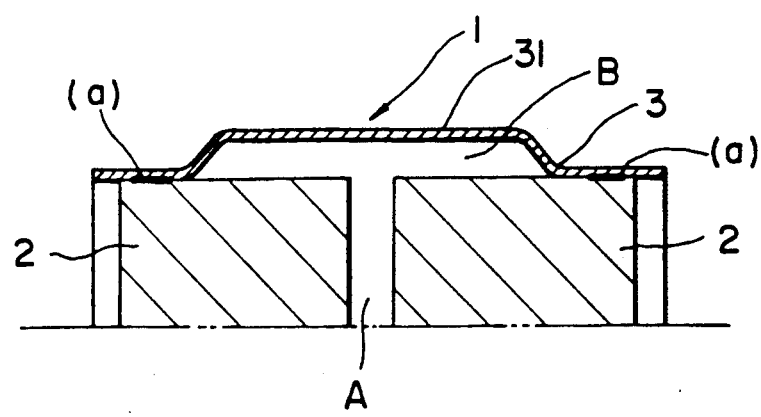
FIG. 2 is a fragmentary longitudinal cross-sectional view of the apparatus of FIG. 1.

(I) FIGS. 1 and 2 illustrate an exhaust gas cleaning apparatus according to a first embodiment of this invention; FIG. 1 is a perspective view, partially broken away, of the cleaning apparatus, and FIG. 2 is a fragmentary longitudinal cross-sectional view of the cleaning apparatus.

In the manufacture of the exhaust gas cleaning apparatus 1 of this invention, two honeycomb core bodies 2, 2 are arranged, with an axial space A of a predetermined width therebetween, in a tubular metal casing 3 opening at opposite ends, and are fixed to the metal casing. As shown in FIG. 2, the outer peripheral surface of each honeycomb core body 2 is fixed, by brazing, to the inner surface of the tubular metal casing 3 at the marginal part near one of the open ends of the metal casing 3. Thus he axial space A has been formed between the honeycomb core bodies 2, 2, and meanwhile a hollow B offering the heat insulating effect has been formed between the outer peripheral surfaces of the individual honeycomb core bodies 2, 2 and the inner surface of the enlarged-diameter portion 31 of the metal casing 3. With this arrangement, as is seen from FIG. 1, since the outer peripheral surface of each of the honeycomb core bodies 2 remains non-fixed with respect to the inner surface of the metal casing 3 at the marginal part near the axial space A, the non-fixed part of the individual honeycomb core bodies 2, 2 are allowed to be expanded and contracted axially.

For the production of the honeycomb core body 2, a sheet-like band 21 made of a heat-resistant thin steel sheet and a corrugated band 22 made from a thin steel sheet of the same kind are superposed one over the other so as to have areas of contact therebetween, and then are rolled together into a spiral form defining many network-patterned exhaust gas flow passages 23 which allow exhaust gas to flow therethrough.

A heat-resistant steel sheet containing 20% by weight of chromium and 5% by weight of aluminum and having a thickness of 0.05 mm and a width of 30 mm was used as a sheet-like band 21. Meanwhile, another steel sheet of the same kind as the sheet-like band 21 was shaped into a wavy form, and the resulting wavy sheet was used as a corrugated band 22. In this embodiment, two sets of these sheet-like and corrugated bands 21, 22 were rolled together, each set into a spiral form, to thus provide two identical honeycomb core bodies 2, 2.

Figure 3:
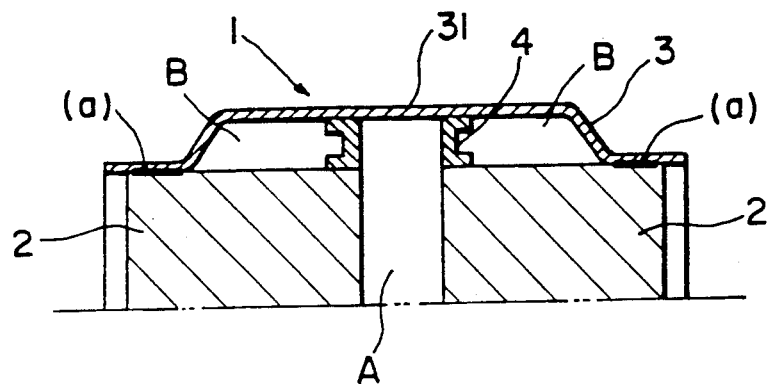
FIG. 3 is a view similar to FIG. 2, showing a second embodiment.

(II) FIG. 3 illustrates a modified exhaust gas cleaning apparatus 1 according to a second embodiment of this invention. In this modified cleaning apparatus, unlike the first embodiment, at least one pair of spacers 4 are disposed in the hollow in order to improve the vibration resistance. Each of the spacers 4 is fixed at one side to the outer peripheral surface of a respective one of the honeycomb core bodies 2 near the axial space A and is disposed against the inner surface of the enlarged-diameter portion 31 of the metal casing 3, so that the individual honeycomb core bodies 2, 2 near the axial space A are allowed to be expanded and contracted axially, thus absorbing the axial stress due to thermal strains. The spacers 4 are arranged at predetermined spaces circumferentially around the outer peripheral surface of the individual honeycomb core body 2. Alternatively, one of the pair of spacers 4 may extend around the entire circumference of each honeycomb core body 2; in this case, if an opening is formed in the spacer 4 for high-temperature gas in the axial space A to flow into the hollow B, it is possible to uniformalize the distribution of temperature inside the metal casing, thus preventing the local concentration of thermal strains.

Figure 4:
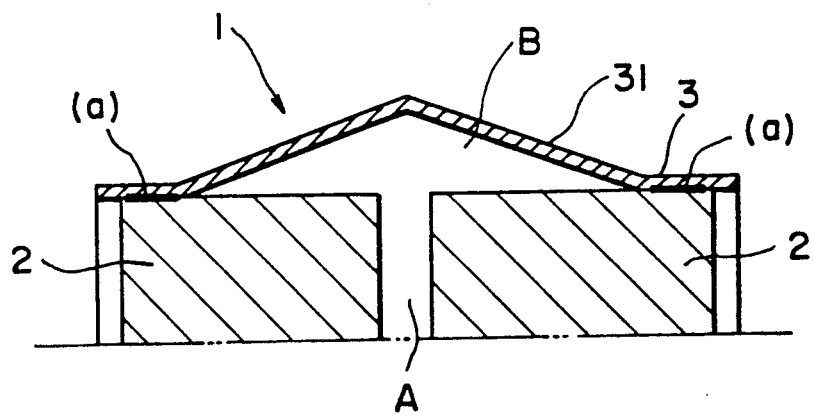
FIG. 4 is a view similar to FIG. 2, showing a third embodiment.

(III) FIG. 4 illustrates a third embodiment, in which the enlarged-diameter portion 31 of the metal casing 3 is different in shape from that of the first embodiment.

Figure 5:
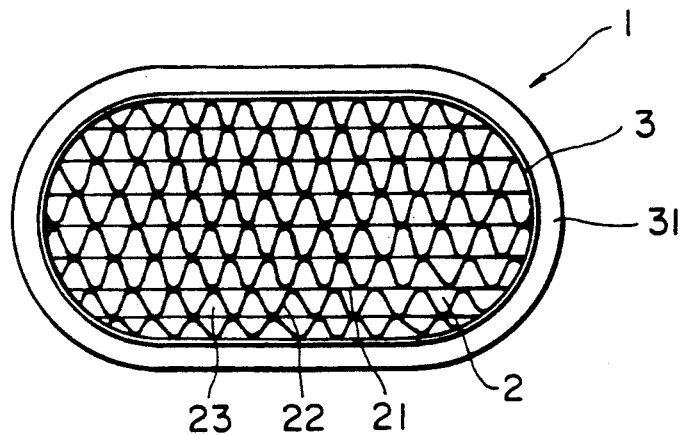
FIG. 5 is a front view of a modified exhaust gas cleaning apparatus according to a fourth embodiment.

(IV) FIG. 5 illustrates a fourth embodiment. In this embodiment, unlike the first embodiment, the sheet-like and corrugated bands 21, 22 of the honeycomb core body 2 are laminated in layers, and the metal casing 3 has a racing-track-shaped cross section.

Figure 6:
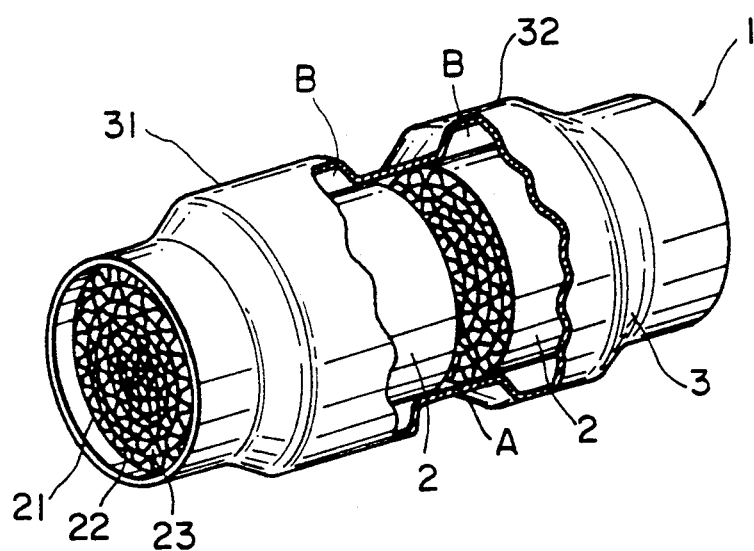
FIG. 6 is a view similar to FIG. 1, showing a fifth embodiment.
Figure 7:
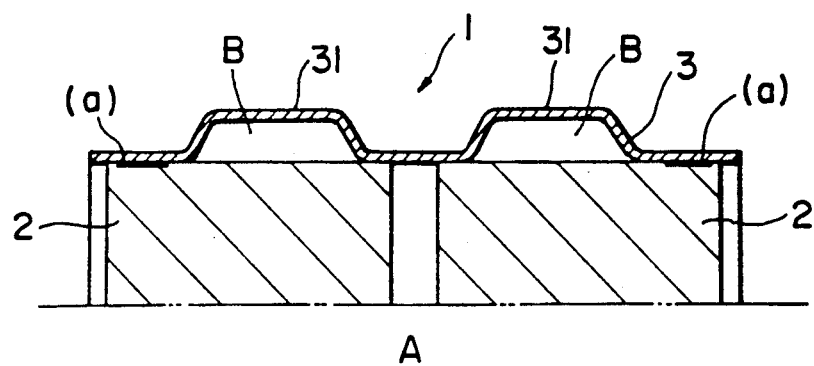
FIG. 7 is a fragmentary longitudinal cross-sectional view of the apparatus of FIG. 6.

(V) FIGS. 6 and 7 illustrate a still modified exhaust gas cleaning apparatus 1 according to a fifth embodiment: FIG. 6 is a perspective view, partially broken away, of the cleaning apparatus, FIG. 7 is a fragmentary longitudinal cross-sectional view of the same apparatus.

In the manufacture of two honeycomb core bodies 2, 2 are arranged, with an axial space A of a predetermined width therebetween, in a tubular metal casing 3 opening at opposite ends, and is fixed to the metal casing 3.

The outer peripheral surface of the individual honeycomb core body 2 is fixed, by brazing, to the inner surface of the tubular metal casing 3 at the marginal part near a respective one of the opposite open ends of the metal casing 3, and is only disposed against the inner surface of the central part of the metal casing 3 at the part near the axial space A.

A heat-resistant steel sheet containing 20% by weight of chromium and 5% by weight of aluminum and having a thickness 0.05 mm and a width of 30 mm was used as a sheet-like band 21. Meanwhile, another steel sheet of the same kind as the sheet-like band 21 was shaped into a wavy form, and the resulting wavy sheet was used as a corrugated band 22. In this embodiment, two sets of these sheet-like and corrugated bands 21, 22 were rolled together, each set into a spiral form, to thus provide two identical honeycomb core bodies 2, 2.

Figure 8:
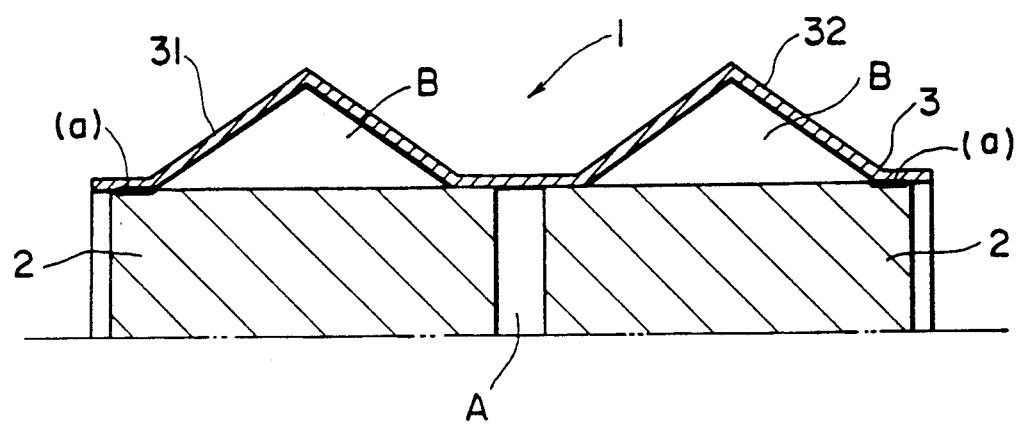
FIG. 8 is a view similar to FIG. 7, showing a sixth embodiment.

(VI) FIG. 8 illustrates a sixth embodiment, in which the enlarged-diameter portions 31, 32 of the metal casing 3 are different in shape from that of the fifth embodiment.

Figure 9:
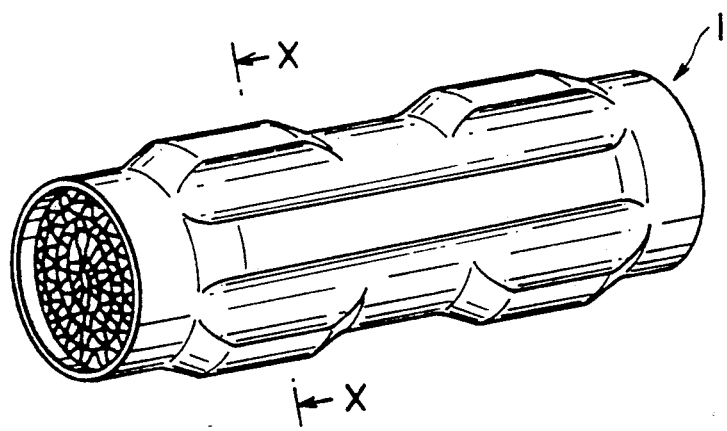
FIG. 9 is a perspective view of a modified exhaust gas cleaning apparatus according to a seventh embodiment.
Figure 10:
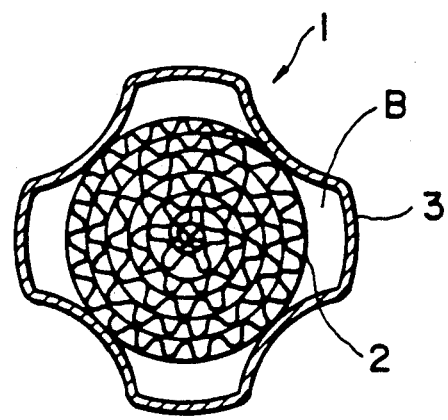
FIG. 10 is an enlarged cross-sectional view taken along line X—X of FIG. 9.

(VII) FIGS. 9 and 10 illustrate an additional modified exhaust gas cleaning apparatus 1 according to a seventh embodiment of this invention; FIG. 9 is a perspective view of the cleaning apparatus, and FIG. 10 is an enlarged cross-sectional view taken along line X—X of FIG. 9. In this embodiment, the tubular metal casing 3 is opening at opposite ends and has a plurality of pairs of first enlarged-diameter portions each disposed between the respective marginal part near one open end and the central part near the axial space, and a plurality of second enlarged-diameter portions striding over the central part near the axial space. With this cleaning apparatus, since high-temperature exhaust gas in the axial space A is drawn into the hollows B defined by the enlarged-diameter portions 31, 32, it is possible to improve the heat insulating effect to a much more extent, as compared with the fifth and sixth embodiments. Thus it is possible to uniformalize the distribution of temperation throughout the individual honeycomb core bodies inside the metal casing.

What is claimed is:

1. An exhaust gas cleaning apparatus comprising: two honeycomb core bodies each carrying thereon an exhaust gas cleaning catalyst and composed of a sheet band made of a thin metal sheet and a corrugated band made from another thin metal sheet, said sheet band and said corrugated band being superposed one over another so as to have areas of contact therebetween and so as to define many network-patterned gas flow passages along a central axis thereof; and a tubular metal casing having a central axis and opposite opened end portions of a first diameter and a central portion having a diameter greater than said first diameter of said end portions, said two honeycomb core bodies being arranged, with an axial space therebetween, in and fixed to said metal casing, an outer peripheral surface of each of said two honeycomb core bodies being fixed only to an inner surface of said respective opened end portions of said metal casing, such that said outer peripheral surface of each said honeycomb core body adjacent the axial space is kept out of contact with an inner surface of said central portion of said metal casing.

2. An exhaust gas cleaning apparatus according to claim 1, further including one or more pairs of spacers each pair mounted on said outer peripheral surface of each said honeycomb core body near said axial space, each pair of said spacers being fixed at one end to said outer peripheral surface of each said honeycomb core body and disposed against said inner surface of said metal casing at said central portion thereof.

3. An exhaust gas cleaning apparatus according to claim 2, wherein said one or more pairs of spacers are arranged at predetermined spaces circumferentially around said outer peripheral surface of each said honeycomb core body.

4. An exhaust gas cleaning apparatus according to claim 2, wherein one of said one or more pairs of spacers extends around an entire circumference of each said honeycomb core body.

5. An exhaust gas cleaning apparatus according to claim 1, wherein said sheet and corrugated bands of each said honeycomb core body are rolled together into a spiral form.

6. An exhaust gas cleaning apparatus according to claim 1, wherein said sheet and corrugated bands of each said honeycomb core body are laminated in layers.

7. An exhaust gas cleaning apparatus according to claim 1, wherein said central portion of said metal casing has a circular cross section having a diameter which varies in an axial direction thereof.

8. An exhaust gas cleaning apparatus according to claim 1, wherein said metal casing has an oval cross section.

9. An exhaust gas cleaning apparatus comprising: two honeycomb core bodies each having opposite ends and carrying thereon an exhaust gas cleaning catalyst and composed of a sheet band made of a thin metal sheet and a corrugated band made from another thin metal sheet, said sheet band and said corrugated band being superposed one over another so as to have areas of contact therebetween and so as to define many network-patterned gas flow passages along a central axis thereof; and a tubular metal casing having a central axis and being opened at opposite ends thereof and including at least three axial portions of a first diameter with different ones of said at least three axial portions of a first diameter contacting an outer peripheral surface of each said honeycomb core bodies at said opposite ends thereof, said tubular metal casing further comprising an axial portion of a diameter greater than said first diameter extending between adjacent ones of said at least three axial portions of said first diameter, wherein one of said at least three axial portions of said first diameter is disposed against the outer peripheral surfaces of adjacent ones of said opposite ends of said two honeycomb core bodies in a non-fixed fashion and the outer peripheral surfaces adjacent the other opposite ends of said two honeycomb core bodies are fixed to different ones of others of said at least three axial portions of said first diameter.

10. An exhaust gas cleaning apparatus according to claim 9, wherein said sheet and corrugated bands of each said honeycomb core body are rolled together into a spiral form.

11. An exhaust gas cleaning apparatus according to claim 9, wherein said sheet and corrugated bands of each said honeycomb core body are laminated in layers.

12. An exhaust gas cleaning apparatus according to claim 9, wherein axial portions of a diameter greater than said first diameter of said metal casing have circular cross sections having diameters which vary in said axial direction.

13. An exhaust gas cleaning apparatus according to claim 9, wherein said metal casing has an oval cross section.

* * * * *